F. O. MATTHIESSEN.
Apparatus for Molding and Liquoring Sugar.
No. 163,092. Patented May 11, 1875.
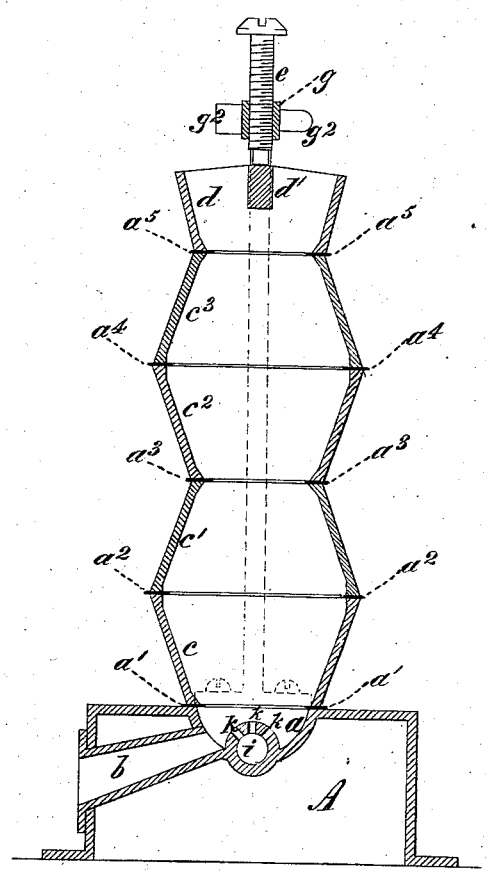
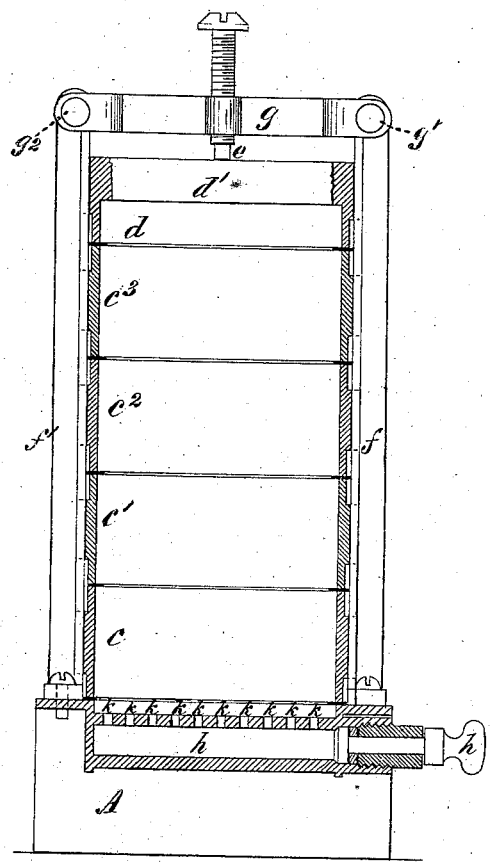
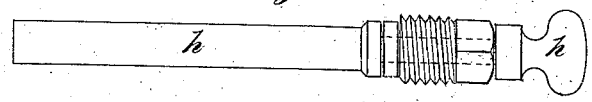

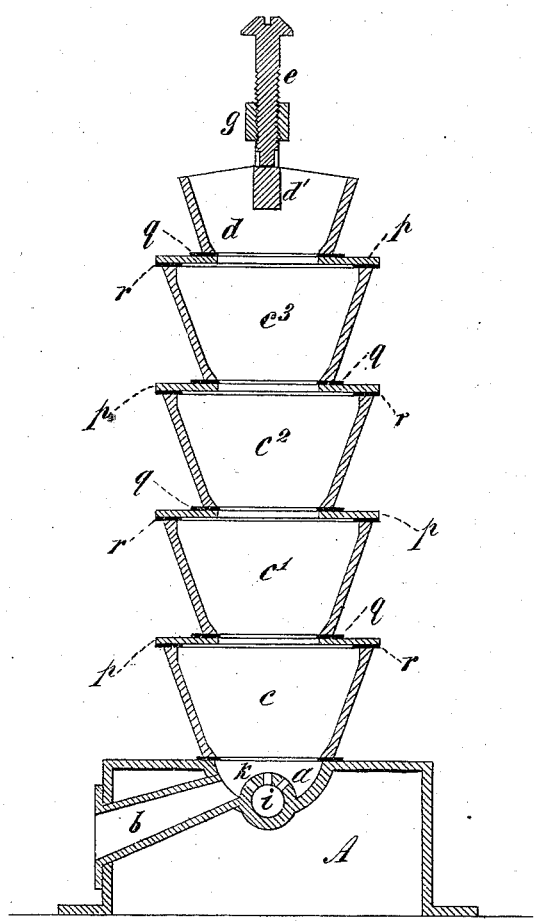

UNITED STATES PATENT OFFICE.

FRANZ O. MATTHIESSEN, OF NEW YORK, N. Y.

IMPROVEMENT IN APPARATUS FOR MOLDING AND LIQUORING SUGAR.

Specification forming part of Letters Patent No. 163,092, dated May 11, 1875; application filed April 9, 1875.

*To all whom it may concern:*

Be it known that I, FRANZ O. MATTHIESSEN, of the city and State of New York, have invented certain Improvements in Apparatus for Filling Sugar-Molds, and for Treating Sugar in the Molds, of which the following is a specification:

My improvements relate both to the construction of sugar-molds and to the apparatus in which molds are filled, and the sugar contained in them cleansed; and my invention consists in the arrangement, upon a liquoring or cleansing table, of suitable apparatus for holding a series of molds in such position that they can all be filled with the sugar mass at one operation, and, when filled, the sugar contained in them can be liquored or freed from green sirup at one operation, and with improved effect.

The accompanying drawings are as follows: Figure 1 is a transverse vertical section of a liquoring-table and a series of my molds, placed one above the other over the opening in the table, through which the sugar mass and the cleansing-liquor are forced. Fig. 2 is side elevation of the frame which supports the molds, showing the molds and the pipe through which the cleansing-liquor is injected, in a longitudinal vertical section. Fig. 3 is a view of the plug for stopping the cleansing-liquor pipe during the operation of filling the molds with the sugar mass. Fig. 4 shows a modified arrangement of the molds.

Referring to the drawings, A represents the liquoring-table, having a semi-cylindrical cavity, $a$, in the top, which cavity is connected with a nozzle, or pipe, $b$, through which the sugar mass is forced into the cavity, and from thence upward into a series of mold-frames, $c$, $c^1$, $c^2$, and $c^3$. Each of the mold-frames presents the appearance of a box having inclined sides, but no top or bottom. The lower edge of the lowermost mold-frame $c$ conforms in shape to the mouth of the cavity $a$, and rests upon a strip of elastic material, $a^1$, which is placed on the table around the edge of the cavity $a$. The next mold-frame (or, as it will be more convenient to call it, mold) $c^1$ is reversed in position, so as to fit the top of the mold $c$, and another strip of elastic material, $a^2$, is introduced between the edges of the two molds $c$ and $c^1$. The molds are alternately reversed as they are placed one above the other, as shown in Fig. 1, and are separated from each other by the elastic packing-strips $a^2$, $a^3$, and $a^4$. The uppermost mold $c^3$ is provided with a similar packing-strip, $a^5$, upon its upper edge, which serves to pack the joint between the uppermost mold and the surplus mold-frame $d$. The latter is provided with a horizontal bar, $d'$, extending from end to end, which furnishes a bearing for the screw-bolt $e$, by means of which the molds are pressed firmly downward upon the table, and upon each other, so as to make tight joints by means of the packing-strips $a^1$, $a^2$, $a^3$, $a^4$, and $a^5$. The molds are held in position by means of two vertical guides or ways, $f$ and $f'$, which are, respectively, bolted to the top of the liquoring-table. The inner faces of these guides respectively engage grooves in the opposite ends of the mold-frames. The upper ends of the vertical guides $f$ and $f'$ are secured to a cross-bar, $g$, by means of the pins $g^1$ and $g^2$. The screw-bolt $e$ passes vertically through the center of the cross-bar $g$, engaging a female thread therein.

It will be seen that by loosening the screw-bolt $e$, and removing the pins $g^1$ and $g^2$, the cross-bar $g$ can be detached, so that the molds can be slipped in or out of position upon the guides $f$ and $f'$. When the molds are in position, and have been clamped down by means of the screw-bolt $e$, as has been described, they may be filled with the sugar mass from the top through the surplus mold $d$, or from the bottom through the nozzle $b$.

The object of the surplus mold $d$ is threefold: first, to furnish the means for transmitting the pressure of the screw-bolt $e$ to the several molds below it, so that tight joints may be made between the several molds and the table, as has been stated; secondly, to facilitate the introduction of the sugar mass into the molds from the top; thirdly, to hold an excess of the sugar mass, so as to insure the complete filling of the uppermost mold when the sirup is separated from the crystals, and the latter settle down. The ejection-nozzle $b$ will of course be connected, by a pipe, with the vacuum-pan, which will be provided with a stop-cock, to be closed when the molds are full.

The cleansing operation is performed by removing the plug $h$ and injecting the cleansing-liquor into the pipe $i$, from which it passes through the perforations $k$ $k$ $k$, &c., upward through the sugar mass contained in the molds, carrying the green sirup into and over the surplus frame $d$ at the top. By this mode of cleansing sugar only one crust is formed, and the green sirup is wholly eliminated from the sugar contained in the molds; or, if a large proportion of sirup be present in the sugar mass, the lower molds will be wholly freed from it, and the sugar mass in the upper mold only will exhibit it.

It is an important advantage attending the use of my invention that I am able to prolong the boiling operation in the vacuum-pan until my sugar mass contains an unusually large proportion of crystallized material. This I am enabled to do because of the facility with which I can fill a series of molds, and thus handle rapidly a large quantity of material. It follows that I have a less proportion of green sirup to drive out of the sugar mass contained in the molds.

When the liquoring operation is completed the surplus frame $d$ is removed, and the molds are taken out and separated from each other, and are deposited in a centrifugal machine, wherein the inclined sides of the mold-frames occupy radial vertical planes.

The mold-frames may be arranged with reference to each other, as shown in Fig. 4, if desired. In such case a perforated plate, $p$, will be introduced between the molds, and the two packing-strips $q$ and $r$ will be introduced between the plate and the edges of the molds, as shown.

I claim as my invention—

1. The combination of a series of sugar-molds with guides for preserving their alignment, for the purpose of enabling the sugar-molds to be filled with the sugar mass at one operation.

2. The combination of one or more sugar-molds with a surplus frame or box, for containing an excess of the sugar mass.

3. The combination of a liquoring-table with a series of sugar-molds, connectedly arranged thereupon, and a liquoring-pipe, for the purpose of liquoring the sugar mass contained in the molds at one operation.

4. The combination of a liquoring-table provided with a liquoring-pipe, with a series of connectedly-arranged sugar-molds and a surplus frame or box.

5. The combination of a series of connectedly-arranged sugar-molds with elastic packing-strips placed between the several molds and their respective bearings, and a set-screw, for the purpose of compressing the series of molds, and thus making tight joints at all the bearings.

6. The combination of the vertical guides $f$ and $f'$ with the removable cross-bar $g$, for the purpose of permitting the introduction or removal of the sugar-molds, substantially as shown and described.

F. O. MATTHIESSEN.

Witnesses:
F. M. QUIMBY,
J. H. CUBBERLY.